(12) United States Patent
Chen

(10) Patent No.: US 11,489,455 B2
(45) Date of Patent: Nov. 1, 2022

(54) AC AND PERSISTENT DC CO-DISTRITBUTION

(71) Applicant: Entrantech Inc., Gilroy, OR (US)

(72) Inventor: Kong-Chen Chen, Gilroy, CA (US)

(73) Assignee: Entrantech Inc., Gilroy, CA (US)

( * ) Notice: Subject to any disclaimer, the term of this patent is extended or adjusted under 35 U.S.C. 154(b) by 0 days.

(21) Appl. No.: 17/398,355

(22) Filed: Aug. 10, 2021

(65) Prior Publication Data

US 2022/0052618 A1  Feb. 17, 2022

Related U.S. Application Data

(60) Provisional application No. 63/065,341, filed on Aug. 13, 2020.

(51) Int. Cl.
*H02M 7/217* (2006.01)
*H02J 1/00* (2006.01)
*H02M 3/155* (2006.01)

(52) U.S. Cl.
CPC .............. *H02M 7/217* (2013.01); *H02J 1/00* (2013.01); *H02M 3/155* (2013.01)

(58) Field of Classification Search
CPC ................................................. H02M 7/217
USPC .......................................................... 307/72
See application file for complete search history.

(56) References Cited

U.S. PATENT DOCUMENTS

| 5,786,642 | A | 7/1998 | Wilhelm |
| 6,320,359 | B1 | 11/2001 | Nagaya et al. |
| 6,798,666 | B1 | 9/2004 | Alexander et al. |
| 10,840,735 | B1 * | 11/2020 | Cooper ............. H02J 13/00004 |
| 11,183,851 | B1 | 11/2021 | Chen |
| 2004/0085043 | A1 | 5/2004 | Germagian et al. |
| 2005/0225955 | A1 | 10/2005 | Grebenkemper et al. |
| 2005/0237724 | A1 | 10/2005 | Fiorentino et al. |
| 2006/0244620 | A1 | 11/2006 | Sotiriou |
| 2011/0053394 | A1 | 3/2011 | Hood, III et al. |
| 2012/0118602 | A1 | 5/2012 | Remmert |
| 2013/0015714 | A1 | 1/2013 | Kwok |
| 2015/0048767 | A1 * | 2/2015 | Takezawa ................. H02P 6/14 |
| | | | 327/109 |
| 2015/0348733 | A1 | 12/2015 | Shi et al. |
| 2018/0212420 | A1 | 7/2018 | Chen |
| 2022/0014014 | A1 | 1/2022 | Chen |
| 2022/0052619 | A1 | 2/2022 | Chen |
| 2022/0158482 | A1 | 5/2022 | Chen |

OTHER PUBLICATIONS

International Search Report & Written Opinion dated May 3, 2022 (ISA/US) in PCT Application PCT/US2021/059792.

(Continued)

*Primary Examiner* — Joseph Chang

(74) *Attorney, Agent, or Firm* — Weaver Austin Villeneuve & Sampson LLP

(57) ABSTRACT

An apparatus leverages the existing power interconnect for DC power delivery by including a persistent DC power module into a power panel, thereby enabling a more efficient use of the energy. The persistent DC power module includes, in part, a control unit which is adaptive to the variations and availability of the external DC power source to ensure a constant and consistent delivery of DC voltage. The apparatus minimizes energy waste and e-waste, and is compatible with the existing legacy AC infrastructure.

20 Claims, 7 Drawing Sheets

(56) References Cited

OTHER PUBLICATIONS

U.S. Notice of Allowance dated Jun. 9, 2022 in U.S. Appl. No. 16/950,882.
U.S. Appl. No. 17/402,450, inventor Chen K.C., filed Aug. 13, 2021.
U.S. Corrected Notice of Allowance dated Jun. 21, 2022 in U.S. Appl. No. 16/950,882.
U.S. Notice of Allowance dated Feb. 15, 2022 in U.S. Appl. No. 16/950,882.
U.S. Notice of Allowance dated Jul. 27, 2021 in U.S. Appl. No. 17/062,413.
U.S. Non-Final office Action dated Aug. 24, 2022 in U.S. Appl. No. 17/402,435.

* cited by examiner

AC AND PERSISTENT DC CO-DISTRITBUTION

CROSS REFERENCE TO RELATED APPLICATIONS

The Present application claims benefit under 35 USC 119(e) of Application Ser. No. 63/065,341, filed on Aug. 13, 2020, the content of which is incorporated herein by reference in its entirety.

FIELD OF THE INVENTION

The present invention relates to apparatus and method for AC and persistent DC co-distribution, and more particularly, to the configuration and control of a persistent DC power module.

BACKGROUND

AC power prevails in most physical infrastructures, such as office, houses, or public facilities. There are many disadvantages in using AC. It is more dangerous than DC. Almost all electronic devices today contain integrated circuits, which run on DC power, and often require users to carry power adaptors to convert AC power into DC.

The conversion process wastes power. The power adaptor is inconvenient to carry either. The old power adaptors often turn into e-waste and deteriorate the invaluable green environments. The portable power adaptor is redundant, if DC power is directly available for use. A technology that makes DC power conveniently available in a physical infrastructure is extremely useful.

Using DC power has additional advantages. A thinner insulation can be chosen for DC power distribution. DC does not suffer astray energy loss through capacitance coupling. Higher current density can be transferred over the same copper wire in DC due to the absence of Eddy current effect. AC possesses more energy loss in power delivery due to the reactance in AC current. Therefore, having DC power directly available in a physical infrastructure has more advantages than its AC counterpart.

Battery is commonly use to source DC power. However, battery is expensive. It has limited lifetime, heavy to carry, takes time to recharge. The manufacturing or disposition of battery may contaminate the environment. It is an auxiliary energy storage device, not a main solution as a key DC power source. A technique that would enable wide availability of DC power, persistently and cost effectively in a physical infrastructure that retains the use of AC legacy equipment, if necessary, is extremely useful.

SUMMARY

An apparatus and method, in accordance with one embodiment, incorporates a persistent DC power module in a power panel to provide either AC power or persistent DC power to the circuit breakers installed in the power panel to power a multitude of power distribution circuits with either AC power or DC power throughout a building. Herein, the term persistent DC power is understood to refer to the DC power that is persistently available for use, regardless of the availability of external DC power sources, such as the regenerated solar power or wind turbine power. Solar panels do not generate electricity at night. When wind blades at wind turbine stop spinning, there is no wind power. Battery has a limited energy storage capability and limited lifetime to be a persistent DC power source. It is essential to have a DC power persistently available in a cost-effective way once a DC power is chosen for use in a physical infrastructure.

In an embodiment, a persistent DC power module includes, in part, input connections to the AC power and one or more external DC power sources. An AC-DC conversion device (ADC) is disposed in the persistent DC power module, but is not continuously enabled to convert AC power into DC. The ADC is activated only when external DC power is unavailable for sourcing. The persistent DC power module monitors the strength of external power to determine when to activate its ADC to output DC power.

There is an automatic control in the persistent DC power module. The persistent DC power module defaults to select external DC power for output. The persistent DC power module includes a voltage detection device, such as an AC switching control comparator, adapted to monitor an attenuated voltage input from the external DC power source with respect to a reference voltage, such as the one supplied as an AC switching reference voltage Vrefa. When the attenuated voltage drops below Vrefa, the output of the AC switching control comparator will close a normally-open AC power switch embedded in the persistent DC power module to enable the AC power to power up the embedded ADC.

The persistent DC power module also includes a second voltage detection device, such as an output switching control comparator, adapted to monitor an attenuated voltage input from the external DC power source with respect to a reference voltage, such as the one supplied as an output switching control reference voltage Vrefo, to control the change in the open or closed state of a pair of DC switches embedded in the persistent DC power module. The AC switching reference voltage is higher than the output switching control reference voltage.

As the external DC voltage gets smaller and falls below the output switching control reference voltage, which is supplied as an input to the output switching control comparator, the output of the output switching control comparator switches the state of the pair of DC switches to disconnect the regulated external DC power and to connect the regulated output from the embedded ADC to the output port of the persistent DC power module.

A third reference voltage, such as the one supplied as a regulator reference voltage Vrefr, controls the output voltage level of the embedded external DC voltage regulator and the embedded ADC. The same reference voltage Vrefr is applied to both embedded devices to ensure both have the same DC voltage output. The regulator reference voltage Vrefr is lower than the output switching control reference voltage Vrefo Since there are three wires in a typical power distribution interconnect in the US, a converted DC power distribution circuits connected to DC circuit breaker in an AC and DC co-existence power panel is able to carry up to two persistent DC powers.

Embodiments of the present disclosure take advantage of the regenerated energy and the existing AC power infrastructure, such as the existing AC power panel, the AC power distribution circuits, and the AC sockets, that receive power from an AC utility power as a supplement backup, to enable a transition in power usage from AC power to DC power smoothly and economically.

By revising the power panel at a facility, or a house, and including a persistent DC power unit in the panel, the power panel may be configured for use as an AC power panel, a persistent DC power panel, or a concurrent AC and persistent DC power panel. It therefore enables the co-use of AC power and DC power in a convenient, cost effective, and energy efficient way. Various illustrations are provided to depict the new configuration of a concurrent (co-existing) AC and DC power panel. Also shown and described herein are the implementation of a persistent DC power module incorporated in the power panel, and the utilization of the existing AC power distribution circuit for DC power distribution.

In an embodiment, the automatic DC power switching in a persistent DC power module is facilitated by a pair of DC power switches, or by a power mux. Both achieve the same functionality.

When using a pair of voltage comparators for automatic switching control, the first comparator to compare with the input reference voltage controls the turn-on of an AC power switch embedded in the persistent DC power module, and the second comparator to compare with the output switching control reference voltage controls the switching of a pair of DC switches also embedded in the persistent DC power module to select a proper DC power for output.

As the input reference voltage is higher than the output switching control reference voltage, the AC power switch can be turned on in advance when the external DC power drops so that the embedded ADC can stabilize its output ahead of the switching of the pair of DC switches. A higher input reference voltage than output switching control reference voltage also ensures the embedded AC power switch is not turned off too early when the external DC power recovers.

A power mux may be used as a direct replacement of the pair of DC switches as both achieve the same DC power switching function. The power mux selects the regulated DC power for output when the output switching control comparator outputs a high and selects the regulated ADC output when the output switching control comparator output is low.

In an embodiment, a separate regulator reference voltage is applied to both the external DC power regulator and the ADC to regulate their output voltages to have the same value. The regulator reference voltage is lower than the output switching control voltage, so that the external DC power regulator is charged up in advance by the recovered external DC power before the pair of DC switches switch their state, which is controlled by the output of the output switching control comparator.

Although two phase-lines and a neutral are input to a power panel, the AC power distribution circuit comprising three interconnect wires in the US typically only includes a phase line, a neutral and a ground in it, where the neutral is an AC current return path of the phase line, and ground wire is a safety feature for AC and often carries no current. In one embodiment, the three interconnect wires for DC power distribution may be reassigned to convert an AC power distribution circuit into a DC power distribution circuit. This is achieved by reassigning the phase line and neutral to carry DC power for the interconnect wires and to assign the ground wire to function as a current return path for DC powers. The DC power over the two interconnect wires could be the same or at different voltages. In an embodiment, an existing AC power distribution circuit can be leveraged to carry up to two different DC voltages when it is converted into a DC power distribution circuit.

An AC power panel typically distributes a fixed 120V or 240V AC to its AC power distribution circuits. When a set of persistent DC power modules are installed in power panel, the power panel could have the capability to distribute multiple different DC voltages for different DC power distribution circuits for use in the building.

The external DC power sources, such as solar panels, or external battery bank may be configured to output different voltages, such as in serial and/or parallel combination to adjust the voltage values and/or current density. However, a voltage regulator may be required in the persistent DC power module to adjust and/or regulate the external DC power for output to DC power distribution circuits.

The persistent power module, which may be incorporated into a power panel, may be implemented as one or more integrated-circuits, or in a module assembly which includes a set of discrete devices or components. When one or more DC powers are required, one or more integrated circuits or one or more module assemblies can be placed in the power panel to output one or more persistent DC powers for the DC power distribution circuits. The persistent DC power module may be alternatively referred to herein as 'DC power module', or "DC module".

In an embodiment, with the incorporation of a persistent DC power module, a power panel can be configured to include co-existing AC/DC power with additional DC power wirings being incorporated in the power panel to bring the DC output from the persistent DC power module to the DC circuit breakers, while the original AC power wirings in the power panel are still retained to connect the AC power input to the AC circuit breakers. Similar to the AC power panel, there is a panel ground coupled to all circuit breakers being connected to the earth ground in the co-existing AC-DC power panel. A wider and larger internal ground connection may be desirable in the power panel that supports DC power distributions.

The examples below illustrate and described the functionality and design of a persistent DC power module. Although only single persistent DC power is specified in the example, embodiments described herein are equally applicable to the cases where more persistent DC powers are supplied from a single persistent DC module. An example having two persistent DC powers being supplied from a co-existing AC/DC co-existing power panel, which is a potentially common configuration, is also depicted to emphasize that a DC power distribution circuit is capable of delivering up to two different DC powers or voltages.

DETAIL DESCRIPTIONS

In an AC-centric environment, DC energy regenerated by solar panels is often converted into AC for integrating into the nearby AC power grid. The AC power entering the grid then reenters the building, where it is converted back to DC for household electronics, such as computer, TV, or various hand-held devices to use. The conversion of DC to AC and AC to DC is inefficient and results. A significant percentage of the useable energy is wasted as heat in the conversion process.

A more efficient way in using the regenerated energy is to have the regenerated energy directly supplied to power panel for use in the building without the conversion process. The power panel can be a main power panel or a secondary power panel. Only the excessive regenerated energy is converted to integrate into the local power grid.

The DC power is the preferred choice for energy utilization and user friendliness. With the incorporation of a persistent DC power module in a power panel, in accordance with embodiments of the present disclosure, the regenerated energy more be utilized efficiently to provide a persistent DC power is always available, regardless of the availability of external or regenerated DC power. With the implementation of a co-existing AC and persistent DC power panel, which may have dual-DC power output, the existing power distribution circuits are more effectively and efficiently used. Embodiments of the present disclosure minimize energy waste and e-waste, and are compatible with the existing legacy AC infrastructure.

Figure 1:
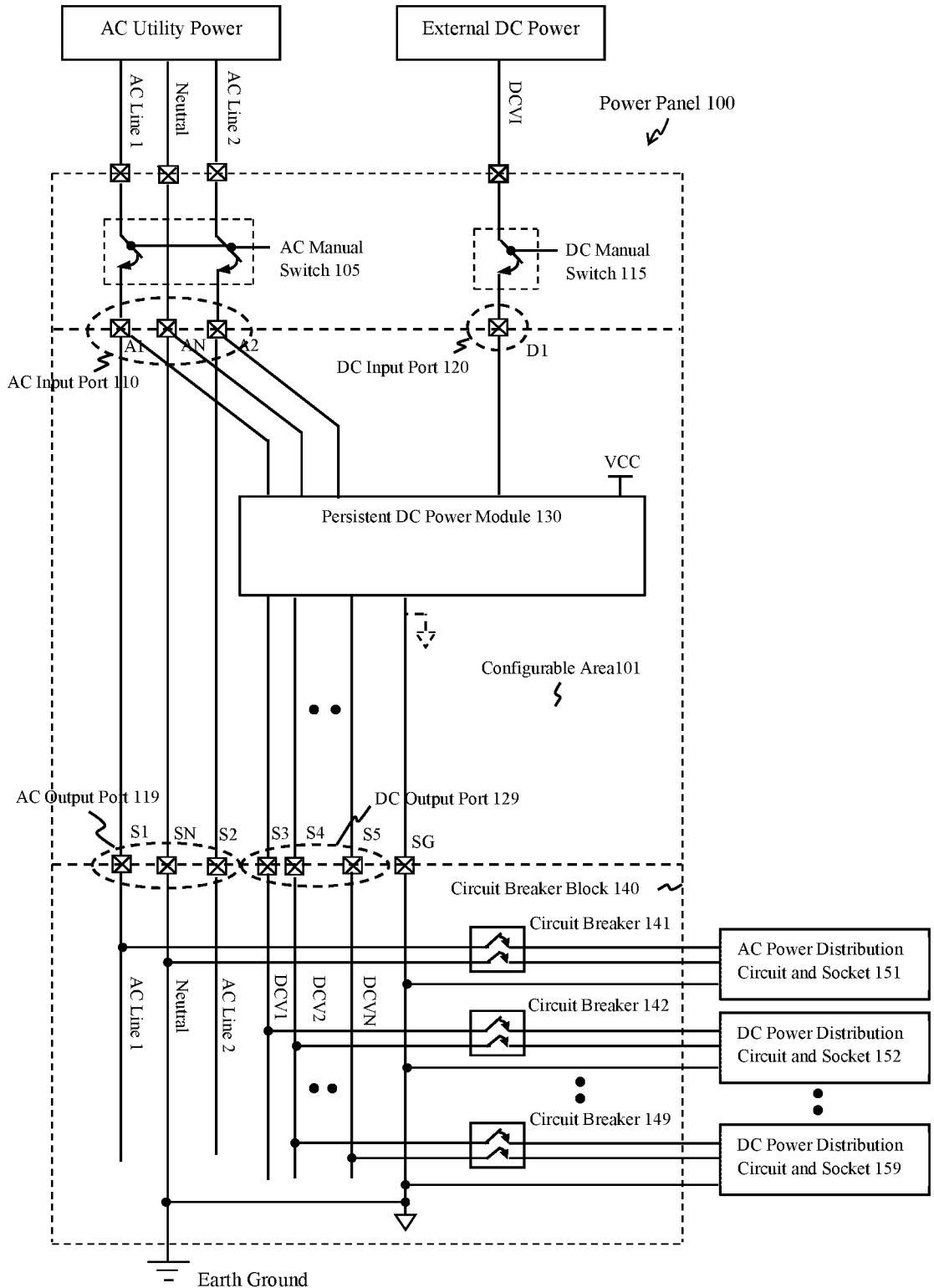
FIG. 1 shows an example of a co-existing AC/DC power panel supplying, in part, a persistent DC voltage, in accordance with one embodiment of the present disclosure.

FIG. 1 shows an example of a co-existing AC and persistent DC power panel 100, in which a persistent DC power module 130 is incorporated in the power panel 100 to provide a persistent DC power continuously at a substantially constant voltage regardless of the availability of external DC power. Such a power panel 100 could be configured as an AC power panel, a persistent DC power panel, or a co-existing AC and persistent DC power panel. The panel is useful in the transition from an AC centric to a DC ubiquitous living space.

AC manual switch 105 and DC manual switch 115 may be included in the power panel 100 to control the inputs of AC utility power and external DC power respectively. In case more DC powers are required for DC power distribution circuits, the persistent DC power module 130 may receive the external DC power input to generate the required DC voltage internally. In the configurable area 101 of power panel 100, the interface terminals A1, AN, and A2 from AC input port 110 are connected to the interface terminals S1, SN and S2 respectively at the AC output port 119 to output AC power for AC power distribution circuits, such as the AC distribution circuit 151 connected to AC circuit breaker 141. Without incorporating a persistent DC power module in the power panel, the power panel 100 is considered an AC power panel.

A separate DC outport port 129 connects the output of persistent DC power module 130 to the DC circuit breakers 142, . . . , 149 in the circuit breaker block 140, to provide DC power for the DC power distribution circuits 152, . . . , 159. When all circuit breakers in the circuit breaker block 140 are connected to the DC output port 129 from the persistent DC power module 130, then the power panel 100 is considered a persistent DC power panel. If both AC circuit breaker 141 and DC circuit breakers 142, . . . , 149 are connected to AC output port 119 and DC output port 129 to source AC power and DC power to respective AC power distribution circuits 151 and DC power distribution circuits 152, . . . , 159, then the power panel 100 is considered to a co-existing AC and persistent DC power panel.

Figure 2:
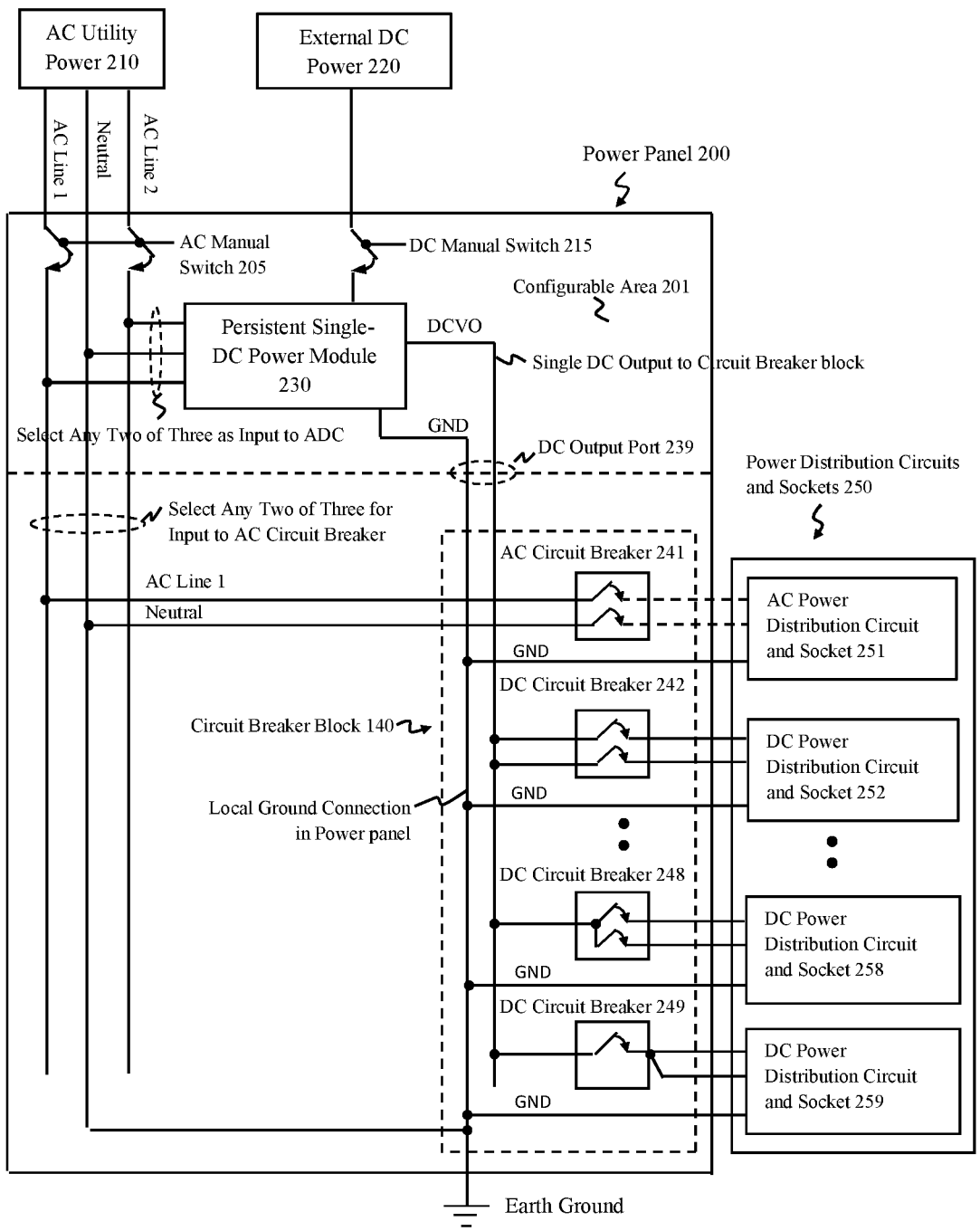
FIG. 2 illustrates an example of a co-existing AC/DC power panel supplying, in part, a persistent DC voltage, in accordance with another embodiment of the present disclosure.

It is understood that the power connection to the AC circuit breakers and the DC circuit breakers are interchangeable so that an existing power distribution circuit can be re-configured to function as an AC power distribution circuit or as a DC power distribution circuit in response to a change in the requirements of power usage. FIG. 2 illustrates a power panel where only a single persistent DC power is output from the persistent DC power module 230 installed in the configurable area 201 of power panel 200. It is the simplest configuration for a power distribution circuit to carry a single DC power to all sockets connected to the DC power distribution circuits. AC manual switch 205 and DC manual switch 215 are included in the power panel 200 to disconnect AC utility power 210 and external DC power 220 respectively. A DC power regulator is included in the persistent single-DC power module 230 (not shown) to regulate the external DC power 220 into a required voltage. The AC utility power 210 in the US typically includes two phase lines and a neutral line. Any two of the three AC wires may be selected to input to one or more AC circuit breakers, such as the circuit breaker 241 to drive AC power distribution circuit 251, where if a phase line and neutral are selected, then it is a 120V AC input. If two phase-lines are selected, then it is a 240V AC input. Also, any two of the three wires can be input to the persistent DC power module 230 to be converted into DC voltages for DC circuit breakers, such as the circuit breakers 242, . . . , 248, 249 to drive DC power distribution circuits 252 . . . 258, 259. AC power distribution circuits are connected to the legacy AC equipment in the building which requires AC power. The DC power distribution circuits deliver DC power for direct use by electronic devices without a need to convert the AC power into DC power. A power interconnect in a building can be configured either as an AC power distribution circuit or as a DC power distribution circuit by properly connecting the internal power wirings in power panel to circuit breakers.

Either a double-pole single-throw (DPST), such as the circuit breaker 242, or a single-pole single-throw (SPST) circuit breaker, such as the circuit breaker 249, can be used as DC circuit breakers in the single-DC case. In one embodiment, a load switch can be selected as a DC circuit breaker. The input and output connections of DC circuit breakers 242 . . . 248, 249 in FIG. 2 deliver the same DC voltage on two hot wires of each DC power distribution circuit. It is noted that delivering single DC power over an existing AC power distribution circuit does not fully utilize the power delivering capability of a power interconnect for DC power distribution.

Figure 3:
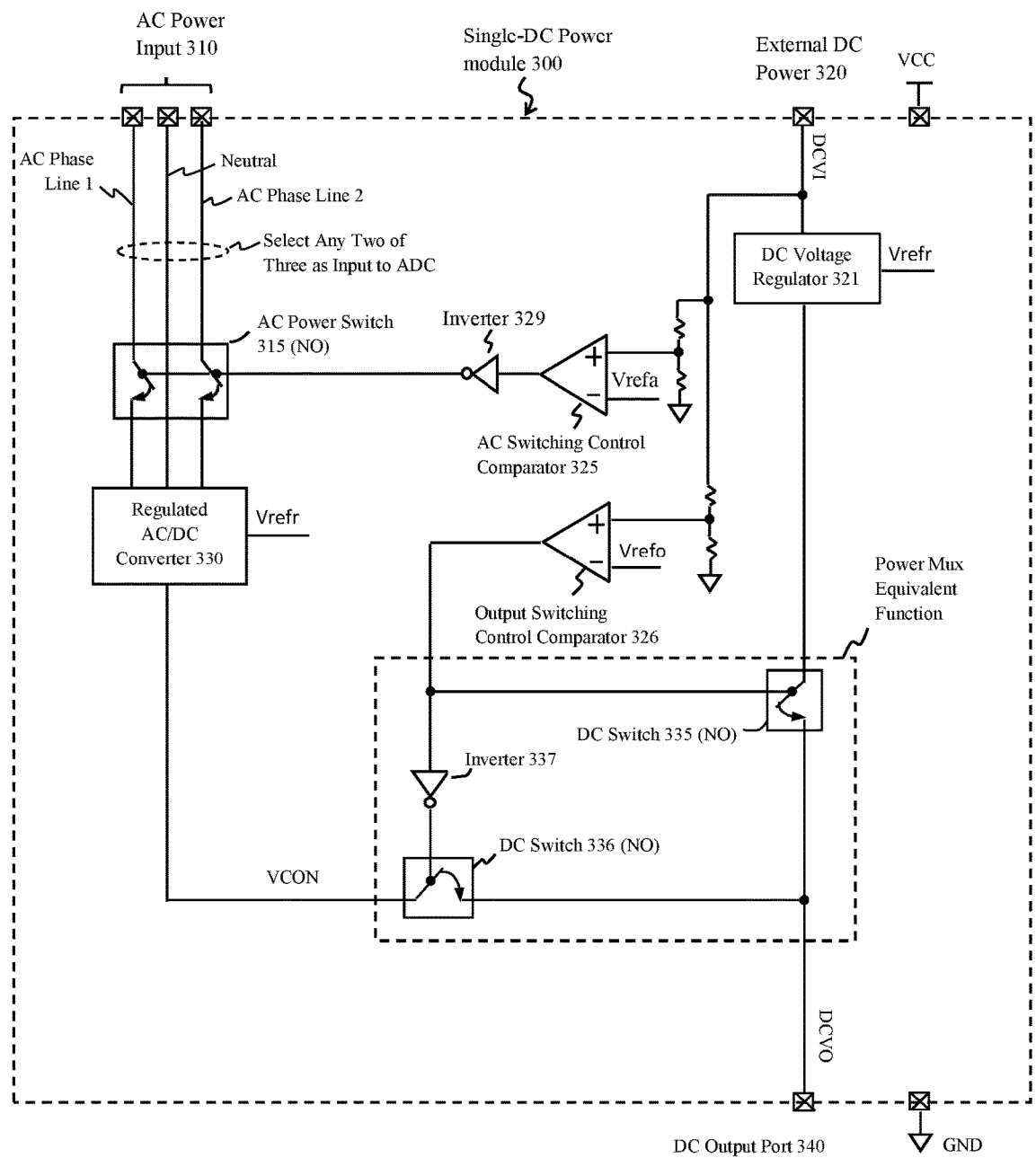
FIG. 3 shows an exemplary functional block diagram of a persistent single-DC power module, in accordance with one embodiment of the present disclosure.

FIG. 3 illustrates an exemplary functional block diagram of a persistent single-DC power module 300. For the persistent single-DC power module 300 shown in FIG. 3, the external DC power 320 input is regulated by a DC voltage regulator 321. In an embodiment, the input external DC power 320 is monitored by two monitoring devices, such as voltage comparators 325 and 326. A voltage divider may be used to attenuate the incoming external DC voltage before they are supplied to the voltage comparator to compare with a reference voltage. Reference voltage Vrefa is shown as being applied to comparator 325, and reference voltage Vrefo is shown as being applied to comparator 326.

There are two DC switches 335, 336 shown in the persistent DC module 300, where both DC switches are shown as being open (NO), but it is understood that they may also be closed. Solid-state DC power switches often use enhancement mode MOSFET as switch control, which are normally-open. The contact in an electromagnetic relay is either normally-open or normally-closed.

In an embodiment, persistent DC power module 300 may include detection devices. For example, a first detection device, which may be a voltage comparator (such as an AC input switching control compactor) 325, monitors the input of the external DC power 320 by comparing its attenuated input with an input reference voltage (i.e. an AC switching control reference voltage) Vrefa to control the turn-on/off of an embedded AC power switch 315 in the DC power module 300. A second detection device, which may be a voltage comparator (i.e., an output switching control comparator) 326, also monitors the input of external DC power 320 by comparing its attenuated input with an output of switching control reference voltage, shown as reference voltage Vrefo to control the switching of the pair of DC switches 335, 336.

The Vrefa is higher than Vrefo. As the external DC power 320 drops from its peak value, first it is detected as being lower than Vrefa, therefore triggering the output of the AC switching control comparator 325 to change to a low value. The inverted output from inverter 392 transitions to a high value thus closing the normally-open AC power switch 315. This enables the AC power input 310 to power ADC 330, which in turn, converts AC power into DC power and generates a regulated and converted DC output. The AC input to ADC 330 can be either 120V AC or 240V AC.

In the meantime, if the attenuated input of external DC power 320 remains above the output switching control reference voltage Vrefo applied to comparator 326, then the pair of DC switches 335, 336 do not change state, yet the embedded ADC 330 is enabled to charge up to ensure the embedded ADC 330 has a stable regulated output in advance.

As the external DC power 320 continues to get weaker and its attenuated input drops below Vrefo, then the output switching control comparator 326 will change its output to a low level. This low output level will cause the closed DC switch 335 to open. The high voltage level at the output of inverter 337 will then cause DC switch 336 to close, thereby disconnecting the regulated output from the DC power regulator 321, and connecting the regulated DC output from ADC 330 to the DC output port 340 of the persistent DC power module 300.

The voltage difference between Vrefa and Vrefo is sufficiently large for the ADC output to stabilize before the pair of DC switches 335, 336 switch to redirect the regulated ADC output to the DC power output port 340.

FIG. 3 show a third reference voltage, i.e., the regulator reference voltage Vrefr shown as being applied to both the DC voltage regulator 321 and to AC/DC (ADC) converter 330 to regulate the converted voltage and to ensure both regulated output voltages are substantially the same. The Vrefr controls the value of output voltage of DC power regulator 321 and regulated ADC 330.

The regulator reference voltage Vrefr is lower than the output switching control reference voltage Vrefo. Voltages Vrefa, Vrefo and Vrefr are programmable, as determined by the characteristic of external DC power 320 and the output voltage requirement of the DC power distribution circuit. Alternatively, a single reference voltage can be chosen, i.e. the highest Vrefa, for the persistent DC power module and then to step down its voltage to Vrefo, and further to step down the voltage to Vrefr, to maintain a fixed voltage difference among the set of reference voltages. The Vrefa can also be set at pre-determined fixed value when the voltage to be output for DC power distribution circuit to meet power requirement is known.

When the external DC power drops, a lower Vrefr than Vrefa and Vrefo assures both the DC voltage regulator 321 and the regulated ADC 330 are powered up to output their target regulated DC voltage after the AC power switch 315 is turned on, regardless of whether the pair of DC switches 335, 336 have been switched or not, as long as the attenuated input of the external DC power 320 remains above Vrefr.

During the power up of regenerated energy, if the external DC power 320 rises to a voltage with its attenuated input reaching Vrefr, the DC power regulator 321 will start to receive sufficient power for output, while the output of regulated ADC 330 remains connected to the DC output port 340. As the external DC power 320 continues to rise and has the attenuated input reaching the output switching control reference voltage Vrefo, the change in output state of comparator 326 will trigger a switching at the pair of DC switches 335, 336 so as to connect the output of DC power regulator 321 to the DC output port 340. If the external DC power 320 continues to rise to exceed Vrefa, then the AC power switch is turned off to save AC power.

The exemplary embodiment shown in FIG. 3 includes one AC switch, two voltage comparators, two DC switches and three reference voltages to ensure a constant, persistent DC power is always ready for output, either from the regulated ADC 330 or from the DC power regulator 321. This exemplary embodiment depicts an automatic control system to ensure a constant and consistent DC power is always available for output from the persistent DC power module. As described above, the system is adaptive to the variations in the external DC power source.

Figure 4:
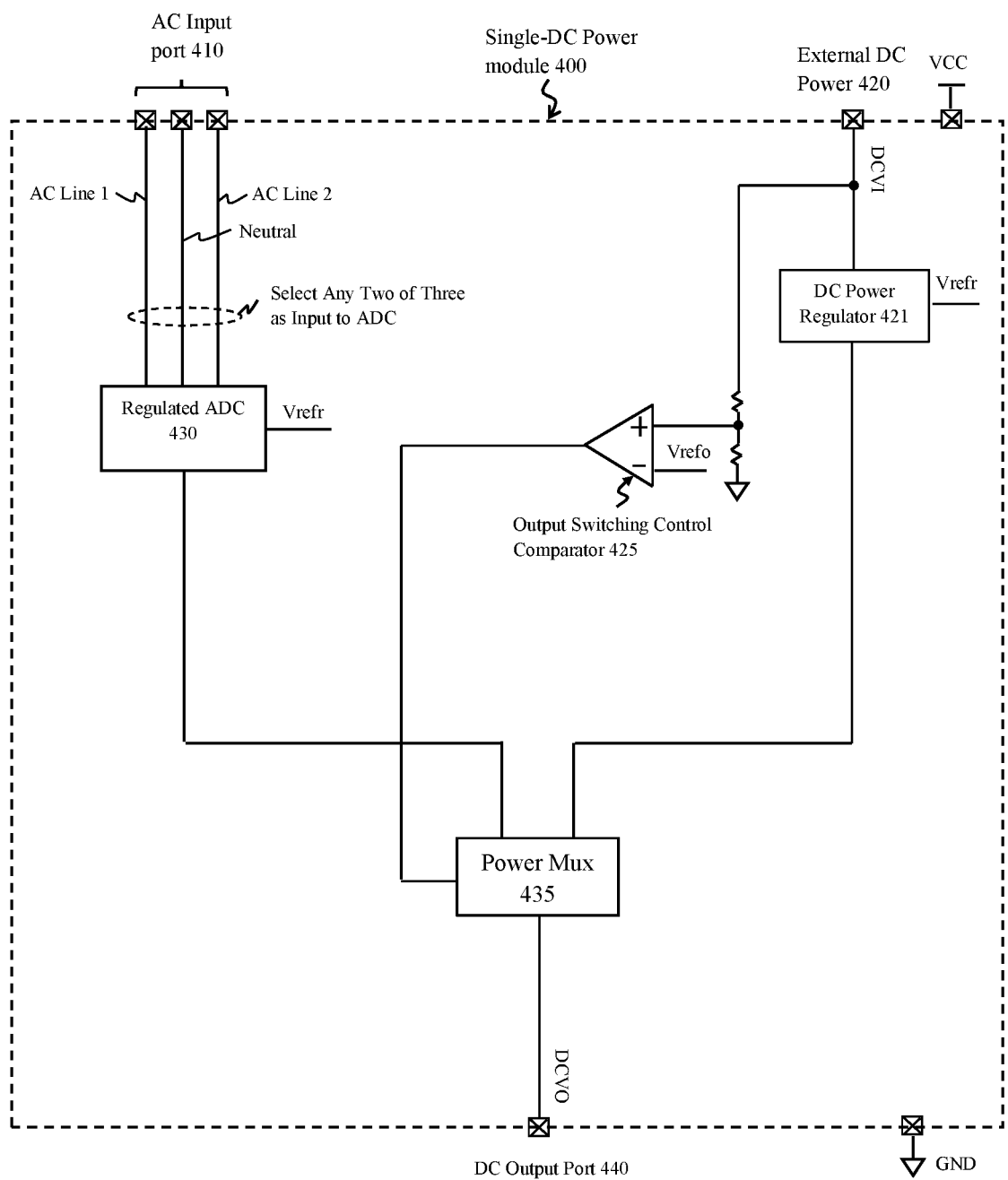
FIG. 4 is a functional block diagram of a persistent single-DC power module, in accordance with one embodiment of the present disclosure.

FIG. 4 is a block diagram of a persistent single-DC power module 400, in accordance with another exemplary embodiment of the present disclosure. In the DC power module 400, the utility AC power is assumed to be always supplied to power up the AC-DC converter to generate a regulated DC output, i.e., a regulated ADC 430. Accordingly, embodiment 400 does not include an input voltage comparator, such as voltage comparator 325 shown in FIG. 3. In addition, embodiment 400 uses a power mux 435 instead of the pair of DC switches 335 and 336 shown in FIG. 3. In FIG. 4, an output switching control voltage regulator 425 compares the input of attenuated external DC power 420 with an output switching control reference voltage Vrefo. If the comparator 425's output is high, then the output of DC power regulator 421 is selected by mux 435. If the comparator 425's output is low, then the output of regulated ADC 430 is selected by power mux 435.

Either an electro-mechanical relay (EMR) or a solid-state relay (SSR) may be used as an AC power switch to facilitate AC power switching in the DC power module.

Figure 5A:
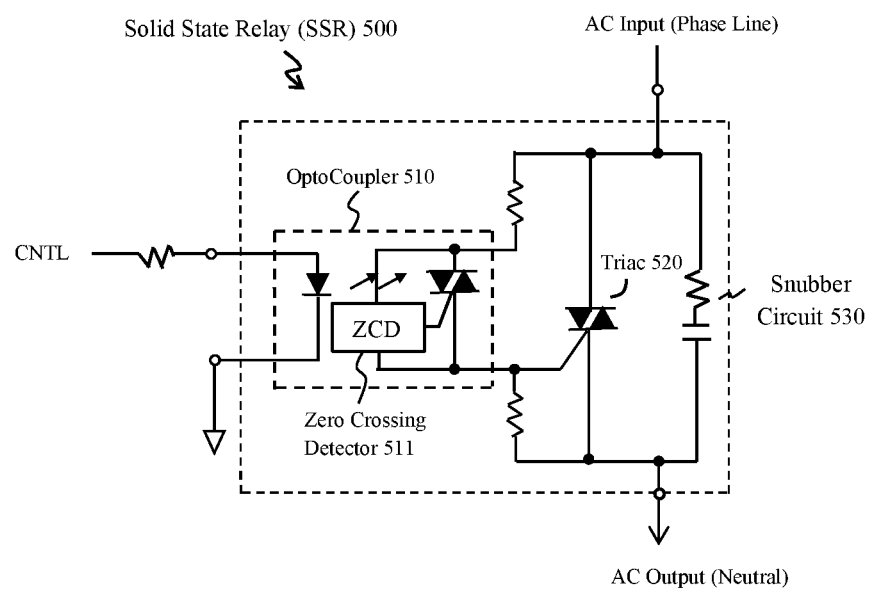
FIG. 5A is an example of solid-state relay as AC power switch, in accordance with one embodiment of the present disclosure.

FIG. 5A shows an example of an SSR 500 connected to a phase line to control the AC power switching. The SSR 500 uses a photoelectric coupler (optocoupler) 510 that decouples the switch control CNTL from the incoming AC power. A zero-crossing detector (ZCD) 511 included in the optocoupler 510 triggers an embedded Triac in optocoupler 510 to switch state at the zero-volt crossing point of the AC power. The output of optocoupler 510, in turn, controls a main Triac 420 in SSR 500 to switch the incoming AC power at its zero-crossing, thus minimizing the switching spike of AC power. A snubber circuit 430 may be included in SSR switch 500 to suppress the voltage spike of inductive load during switching off. In some embodiment, two SSRs may be used as an AC power switch if both phase lines are input to the DC power module. The default state of SSR is typically an open state.

Figure 5B:
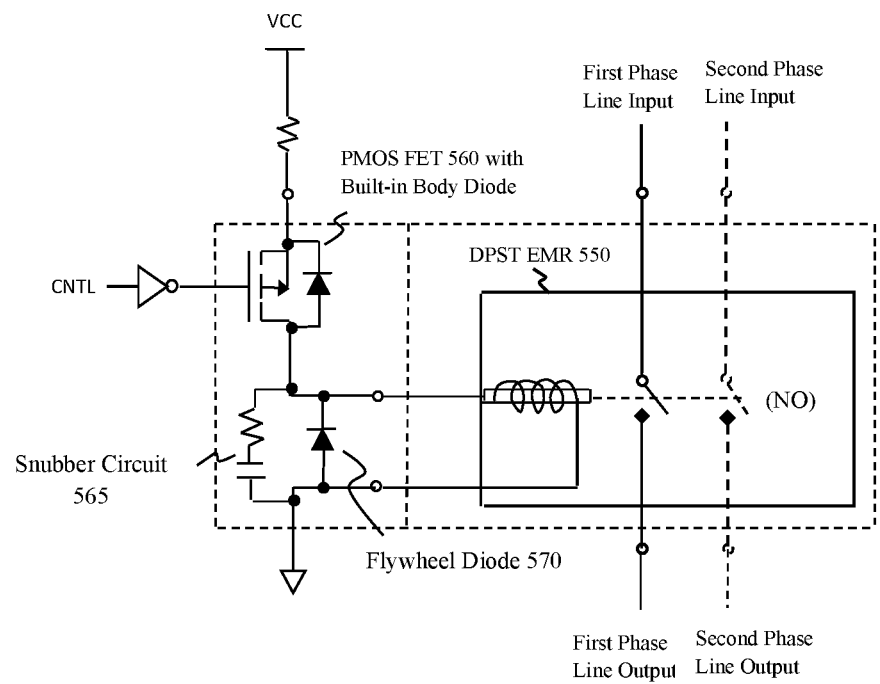
FIG. 5B is an example of electromagnetic relay as AC power switch with PMOS FET as switch control, in accordance with one embodiment of the present disclosure.

FIG. 5B shows an example of using an EMR 550 in an AC power switching. EMR 500 is shown as including, in part, a PMOS FET 560 as the switch control. An electromagnetic coil decouples the EMR control signal CNTL from the AC power to be switched. A bipolar device or a NMOS FET switch may be used as an EMR switch control circuit. A normally-open double-pole, single-throw switch (DPST) EMR 550 shown in FIG. 5B controls the switching of both phase lines from the AC power input. A single-pole, single throw (SPST) EMR may also be used for the AC power switching if only one phase line is input to DC power module. If a user decides to switch off the neutral input, then a DPSR may be used. A snubber circuit 560 and/or a flywheel diode 570 can be used as a protective device to divert the stored energy in electromagnetic coil to prevent damage to the relay at the power off transition. An EMR can be freely selected to be normally-on (i.e., in a closed state) or normally-off (i.e., in an open state) as a default state. For AC power switching, a normally-open default may be preferred.

For DC power switching, a MOSFET device, a load switch, or a DC power mux with one input being open, may be used to control the on/off switching of the DC power. An EMR may also be used for high-power DC power switching but an EMR may not be cost effective. An EMR is slower in switching response, but its low contact resistance has the benefit of a lower voltage drop across its two terminals than a solid-state MOSFET switching device. In some embodiment, a normally-on depletion mode MOSFET may be used as a DC switching device.

Figure 6:
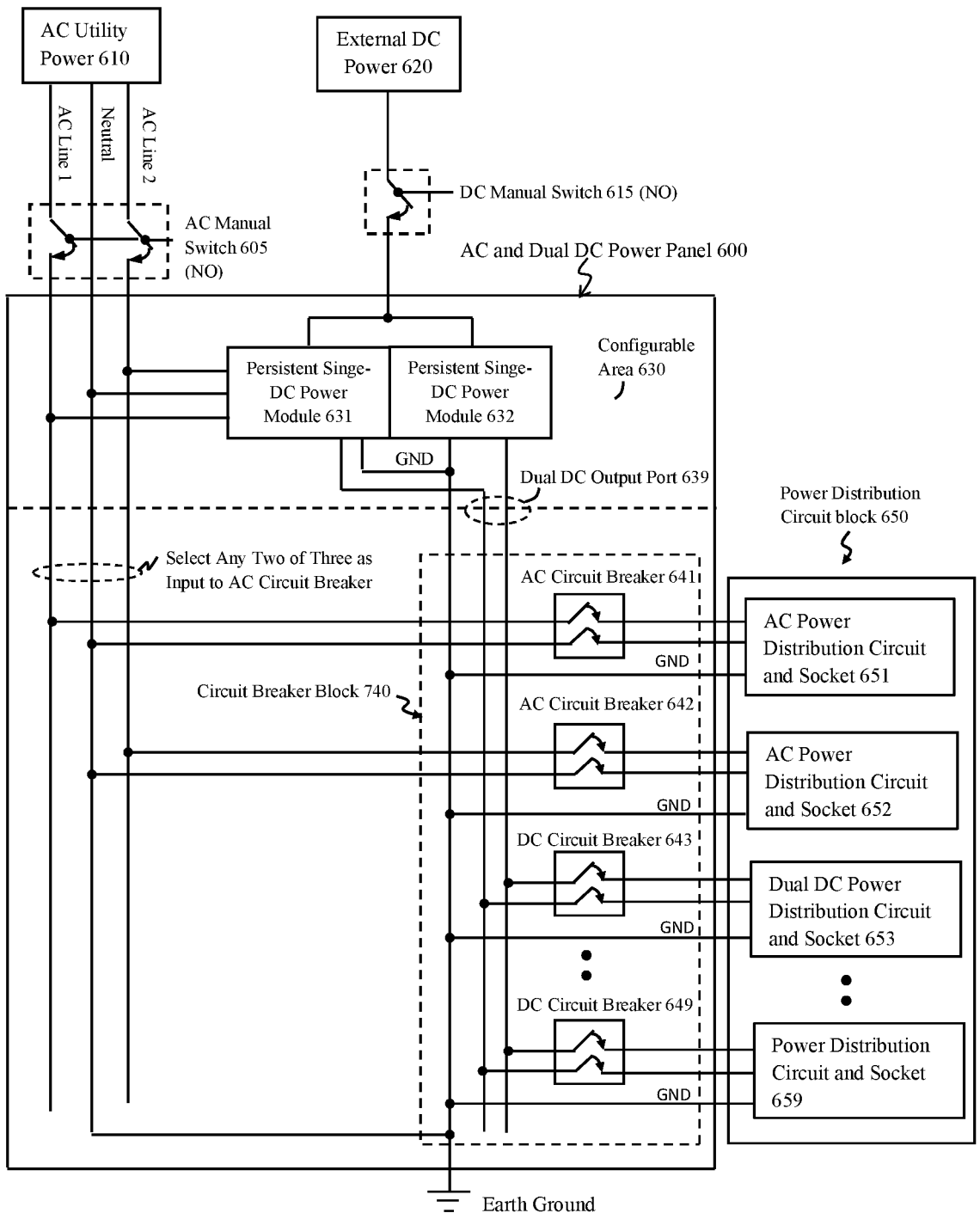
FIG. 6 illustrates an example of a co-existing AC/DC power panel supplying, in part, a persistent DC voltage, in accordance with another embodiment of the present disclosure.

Since an existing power distribution circuit in the US is capable of carrying two different DC powers, a pair of persistent single-DC power modules incorporated in a power panel could provide two persistent DC voltages. The two single-DC power modules may be grouped into a single dual-DC power module. FIG. 6 shows an AC and dual-DC power panel 600 that includes a pair of persistent single-DC power modules 631, 632 in a configurable area 630 to provide two persistent DC powers for DC circuit breakers 641 . . . 648, 649, in accordance with another exemplary embodiment of the present disclosure.

In FIG. 6, the same two DC powers are provided for all DC power distribution circuits 653 . . . 659. Referring to FIG. 1 and FIG. 6 concurrently, different sets of dual DC powers could be provided for different power distribution circuits, if there are sufficient persistent DC power modules in the power panel to support a multitude of DC powers.

Functionally, an AC circuit breaker operates substantially in the same manner as a DC circuit breaker. Both can be manually switched on/off to connect power, or disconnect automatically when any circuit abnormality takes place. However, an AC circuit breaker may be different from a DC circuit breaker, such as with additional GFCI protection or zero-crossing detection feature for safety and reliability concern in the AC circuit breaker.

With AC circuit breakers, such as the circuit breakers 641, 642, being connected to two of the three AC power wires, the DC circuit breakers, such as the circuit breakers 643, . . . 649, are connected to two DC outputs from the pair of persistent single-DC power modules 631, 632. The co-existing AC and DC power panel 600 provides the flexibility to reconfigure a power distribution circuit for AC, single DC or dual DC power delivery.

I claim:

1. An apparatus adapted to provide a persistent DC power, the apparatus comprising:
   an AC input port coupled to an AC power supply;
   a DC input port coupled to an external DC power, wherein the external DC power is regulated in accordance with a first reference voltage to generate a regulated DC voltage;
   a DC output port;
   an AC-to-DC converter (ADC) adapted to convert the AC power supply to a converted DC voltage in accordance with the first reference voltage; and
   a control circuit adapted to monitor the external DC power, said control circuit adapted to:
      enable the regulated DC voltage to be delivered to the DC output port when the external DC power is detected as being higher than a second reference voltage, and
      enable the converted DC voltage to be delivered to the DC output port when the external DC power is detected as being lower than the second reference voltage.

2. The apparatus of claim 1 wherein the second reference voltage is higher than the first reference voltage.

3. The apparatus of claim 1 wherein a phase line and a neutral associated with the AC power supply are applied to the ADC.

4. The apparatus of claim 1 wherein a first phase line and a second phase line in the AC power supply are applied to the ADC.

5. The apparatus of claim 1 wherein the control circuit further comprises:
   a first switch and a second DC switch; and
   a first monitoring device adapted to compare the external DC power to the second reference voltage, wherein
   when output of the first monitoring device is high, the first DC switch connects the regulated DC voltage to the DC output port and the second DC switch disconnects the converted DC voltage from the DC output port, and
   when output of the first monitoring device is low, the first DC switch disconnects the regulated DC voltage from the DC output port and the second DC switch connects the converted DC voltage to the DC output port.

6. The apparatus of claim 1 further comprising:
   a power mux; and
   a comparator adapted to compare a received voltage to the second reference voltage, wherein:
   when an output of the comparator is high, the regulated DC voltage is delivered to the DC output port, and
   when an output of the comparator is low, the converted DC voltage is delivered to the DC output port.

7. The apparatus of claim 1 wherein the apparatus is formed using discrete devices and has a modular form factor.

8. The apparatus of claim 1 wherein the apparatus is assembled in a multi-chip package.

9. The apparatus of claim 1 wherein the apparatus is fabricated as one or more integrated circuits.

10. The apparatus of claim 9 wherein the one or more integrated circuits are disposed in a power panel to provide a plurality of persistent DC powers for delivery to external devices.

11. The apparatus of claim 1 further comprising:
   an AC power switch;
   and a second monitoring device adapted to:
      enable the AC power supply to the ADC when the external DC power is detected as being lower than a third reference voltage, and inhibit the AC power supply to the ADC when the DC voltage is detected as being higher than the third reference voltage.

12. The apparatus of claim 1 wherein the first reference voltage is programmable to adjust an output voltage of the apparatus.

13. The apparatus of claim 11 wherein the third reference voltage is higher than the second reference voltage and the second reference voltage is higher than the first reference voltage.

14. The apparatus of claim 11 wherein at least one of the first reference voltage, the second reference voltage or the third reference voltage is programmable.

15. The apparatus of claim 11 wherein the first and second reference voltages are generated from the third reference voltage and are smaller than the third reference voltage.

16. A power panel comprising:
   an AC power input port coupled to phase lines and a neutral line associated with a received AC power;
   a DC power input port coupled to a received DC power;
   a plurality of DC circuit breakers coupled to a plurality of DC power distribution circuits, and
   one or more DC modules each comprising:
      an AC interface input port module coupled to the AC power input port;
      a DC interface input port module coupled to the DC power input port;
      a DC interface output port module coupled to the plurality of DC circuit breakers;
      an AC-to-DC converters (ADC) adapted to convert the received AC power from the AC interface port to one or more converted DC voltages;
      a voltage regulator adapted to convert the received DC power from the DC interface port to a regulated DC voltage; and
      a control circuit adapted to:
         couple the regulated DC voltage to and decouple the converted DC voltage from the DC interface output port when the received DC power is detected as being higher than a first reference voltage, wherein the converted DC voltage is at same voltage level as the regulated DC voltage, and
         couple the converted DC voltage to and decouple the regulated DC voltage from the DC interface output port when the received DC power is detected as being lower than the first reference voltage.

17. The power panel of claim 16 wherein the power panel delivers two different DC voltages to one of the plurality of DC power distribution circuits.

18. The power panel of claim 16 further comprising:
   a plurality of AC circuit breakers coupled to a plurality of AC power distribution circuits, said plurality of AC circuit breakers receiving AC power from the AC power input port.

19. The power panel of claim 16 wherein the AC power input port and the DC module are coupled to the plurality of AC circuit breakers, wherein the plurality of DC circuit breakers are interchangeable with the plurality of AC circuit breakers to reconfigure the plurality of AC power distribution circuits and the plurality of DC power distribution circuits.

20. The power panel of claim 16 wherein the power panel is reconfigurable as an AC-only power panel, a DC-only power panel, or an AC and DC co-existing power panel.

* * * * *